(12) United States Patent
Kuehne et al.

(10) Patent No.: US 9,678,343 B2
(45) Date of Patent: Jun. 13, 2017

(54) METHOD FOR OPERATING VIRTUAL REALITY GLASSES AND SYSTEM WITH VIRTUAL REALITY GLASSES

(71) Applicant: AUDI AG, Ingolstadt (DE)

(72) Inventors: Marcus Kuehne, Beilngries (DE); Thomas Zuchtriegel, Munich (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/751,836

(22) Filed: Jun. 26, 2015

(65) Prior Publication Data

US 2015/0378157 A1 Dec. 31, 2015

(30) Foreign Application Priority Data

Jun. 26, 2014 (DE) .......................... 10 2014 009 303

(51) Int. Cl.
*G02B 27/01* (2006.01)
*G06F 3/01* (2006.01)
*G06F 3/0484* (2013.01)

(52) U.S. Cl.
CPC ............ *G02B 27/017* (2013.01); *G06F 3/011* (2013.01); *G06F 3/012* (2013.01); *G06F 3/04842* (2013.01); *G02B 2027/014* (2013.01); *G02B 2027/0141* (2013.01); *G02B 2027/0187* (2013.01)

(58) Field of Classification Search
CPC .......... G02B 27/017; G02B 2027/0187; G02B 27/0172; G02B 2027/0178; G06T 19/006; G06T 3/00; G06F 3/012
See application file for complete search history.

(56) References Cited

U.S. PATENT DOCUMENTS

| 2007/0002037 | A1 | 1/2007 | Kuroki et al. |
| 2012/0200600 | A1* | 8/2012 | Demaine ................. A63F 13/10 |
| | | | 345/633 |
| 2013/0257686 | A1 | 10/2013 | Baron et al. |
| 2013/0328762 | A1 | 12/2013 | McCulloch et al. |
| 2013/0335573 | A1 | 12/2013 | Forutanpour et al. |

(Continued)

FOREIGN PATENT DOCUMENTS

| DE | 10 2014 009 303.4 | 6/2014 |
| EP | 2799958 | 11/2014 |

OTHER PUBLICATIONS

German Office Action for German Priority Patent Application No. 10 2014 009 303.4, issued Mar. 2, 2015, 6 pages.

*Primary Examiner* — Nelson Rosario
(74) *Attorney, Agent, or Firm* — Staas & Halsey LLP

(57) ABSTRACT

A method for operating virtual reality glasses involves displaying at least one virtual object from a first virtual viewing position by the virtual reality glasses and displaying the virtual object and a first position symbol at a point corresponding to the first virtual viewing position and at least one further position symbol at a point corresponding to a further virtual viewing position by an external display unit. If a predetermined confirmation action in relation to the further position symbol displayed on the display unit has been detected, a virtual position change is performed by the virtual reality glasses from the first virtual viewing position to the further virtual viewing position, whereupon the virtual object is displayed from the further virtual viewing position by the virtual reality glasses.

20 Claims, 3 Drawing Sheets

(56) References Cited

U.S. PATENT DOCUMENTS

| | | | |
|---|---|---|---|
| 2014/0098132 A1* | 4/2014 | Fein | G06T 19/006 |
| | | | 345/633 |
| 2014/0375687 A1 | 12/2014 | Tanaka | |
| 2015/0169096 A1* | 6/2015 | Nishizawa | G06F 3/0346 |
| | | | 345/173 |
| 2015/0228122 A1* | 8/2015 | Sadasue | G06T 19/006 |
| | | | 345/633 |

* cited by examiner

METHOD FOR OPERATING VIRTUAL REALITY GLASSES AND SYSTEM WITH VIRTUAL REALITY GLASSES

CROSS REFERENCE TO RELATED APPLICATIONS

This application is based on and hereby claims priority to German Application No. 10 2014 009 303.4 filed on Jun. 26, 2014, the contents of which are hereby incorporated by reference.

BACKGROUND

The invention relates to a method for operating virtual reality glasses and a system with virtual reality glasses.

Virtual reality glasses are a certain form of a so-called head-mounted display, which is a visual output device that is worn on the head. It presents images on a display screen close to the eyes or projects it directly onto the retina. Virtual reality glasses also have sensors for detecting head movements. This enables the display of the computed illustration to be adjusted to the movements of the wearer of the glasses. As a result of the physical proximity, the displayed image areas of the head-mounted display appear considerably larger than the free-standing display screens and in the extreme case even cover the entire field of view of the user. Because the display follows a head movement of the wearer as a result of the head mounting, the wearer has the sensation of moving directly in a landscape generated by a computer.

A virtual reality can thus be displayed by such virtual reality glasses, wherein the representation and simultaneous perception of the reality in its physical properties in an interactive virtual environment that is computer generated in real time is usually referred to as a virtual reality.

For example, it can be that a person that is not currently wearing the virtual reality glasses wishes to have an influence on the displayed content of the virtual reality glasses that are currently being worn by another person.

SUMMARY

One possible object is to provide a method for operating virtual reality glasses and a system with virtual reality glasses, by which an external influence on content displayed by the virtual reality glasses is enabled in a particularly simple way.

The inventors propose a method for operating virtual reality glasses which comprises:
  displaying at least one virtual object from a first virtual viewing position by the virtual reality glasses;
  displaying the virtual object and a first position symbol at a point corresponding to the first virtual viewing position and at least one other position symbol at a point corresponding to another virtual viewing position by an external display unit;
  if a predetermined confirmation action in relation to the other position symbol displayed on the display unit has been recorded: carrying out a virtual position change by the virtual reality glasses from the first virtual viewing position to another virtual viewing position, following which the virtual object is displayed from the other virtual viewing position by the virtual reality glasses.

It is preferably provided that a viewing angle to the virtual object is adjusted according to a detected orientation of the virtual reality glasses and hence to the orientation of the head of a wearer of the virtual reality glasses. A wearer of the virtual reality glasses can thus cause the display of the virtual object from diverse viewing angles, initially only starting from the first virtual viewing position.

If an outside person, i.e. a person that is not wearing the virtual reality glasses, wants to influence the virtual viewing position from which the wearer of the virtual reality glasses can view the virtual object, it is easily possible for said external person to effect a virtual position change using the virtual reality glasses by the proposed method by carrying out the predetermined confirmation action in relation to the other position symbol displayed on the display unit. Consequently, the wearer of the virtual reality glasses is moved within the displayed virtual reality from the first virtual viewing position to the further virtual viewing position, so that the wearer of the virtual reality glasses now has the virtual object displayed from the further observation position. This enables an external influence to be exerted in a simple way on the content displayed by the virtual reality glasses.

In an advantageous embodiment it is provided that the first position symbol and the further position symbol are displayed differently by the display unit. As a result it is made known in a simple way to an operator of the display unit from which of the two virtual viewing positions the virtual object is currently being displayed to the wearer of the virtual reality glasses.

According to another advantageous embodiment, it is provided that the virtual object and the position symbols are displayed in a top view by the display unit. The result of this is that an operator of the display unit can identify particularly clearly where the respective virtual viewing positions are located in relation to the displayed virtual object. In particular, if besides the first and the further position symbols still more position symbols are provided and displayed, this type of representation contributes to a particularly clear recognition of the content displayed by the virtual reality glasses.

In another advantageous embodiment, it is provided that by the virtual reality glasses the further or a further position symbol is displayed at a point corresponding to the further virtual viewing position. The wearer of the virtual reality glasses can thus also easily identify that there is at least one further observation position from which he can view the virtual object besides the first virtual viewing position from which he is currently being shown the virtual object.

According to another advantageous embodiment, it is provided that the display unit is of a contact sensitive form, wherein the virtual position change is carried out if the display unit has been touched at the point at which the further position symbol is displayed for at least a predefined confirmation period as the predetermined confirmation action. For example, the display unit can be part of a so-called tablet computer comprising a capacitive display unit. Therefore to bring about the virtual position change the operator of such a tablet computer only has to touch the further displayed position symbol for at least a specified confirmation period, for example two or three seconds. For example, the specified confirmation period can also be individually adjusted by an operator at the display unit.

In another advantageous embodiment, it is provided that the further position symbol displayed by the virtual reality glasses is visually highlighted once the display unit has been touched for at least a specified selection period at the point at which the further position symbol is displayed by the display unit, wherein the selection period is shorter than the confirmation period. In the case of a tablet computer, an operator of the tablet computer can thus for example tap briefly on the further position symbol, whereby the further position symbol displayed by the virtual reality glasses is visually highlighted. The selection period is thereby determined to be the usual length of a tapping process for a tablet computer, for example a tenth of a second, a twentieth of a second or similar. The wearer of the virtual reality glasses is simply advised of the further virtual viewing position in the virtual reality displayed to him by the visual highlighting of the position symbol displayed by the virtual reality glasses. For example, he can cause the virtual position change himself by a suitable specified control action if he so wishes.

A further advantages embodiment provides that once touching of the display unit that is maintained over the selection period has been detected, an animation is displayed by the display unit and/or the virtual reality glasses that identifies a remaining further touch period until the virtual position change is carried out, as long as the display device continues to be touched. Thus for example if the user of the display unit should have briefly tapped on the display unit, whereby the highlighting of the position symbol by the virtual reality glasses is carried out, then he can leave his finger on the display unit for longer, whereby said animation is displayed. For example, the position symbol can comprise an annular part that becomes increasingly smaller with increasing touch period until finally the confirmation period has been exceeded and the virtual position change takes place. Alternatively or in addition, it is also possible that for example an hourglass, a countdown or similar is displayed, by which both the operator of the display unit and also the wearer of the virtual reality glasses are visually notified of how long it will be until the eventual virtual position change occurs. In particular, the wearer of the virtual reality glasses is thus not surprised by a very sudden virtual position change, instead of which he can already be prepared.

In another advantageous embodiment, it is provided that when carrying out the virtual position change the virtual object displayed from the first virtual viewing position by the virtual reality glasses is faded out over a predetermined period, especially one second, and the virtual object displayed from the further virtual viewing position by the virtual reality glasses is faded in over a further predetermined period, especially one second. The fade-out and fade-in times can also be varied during this. In other words, it is also advantageously provided that a type of smooth transition of the displayed virtual object takes place when carrying out the virtual position change. As a result, disorientation and the sensation of an unintentional loss of control on the part of the wearer of the virtual reality glasses is counteracted.

Preferably, in this connection a virtual aperture is closed for fading out the virtual object and the virtual aperture is opened again for fading in the virtual object. A type of iris effect, such as when closing an iris-like camera aperture, is virtually faded in order to cause the smooth transition during the virtual position change.

According to another advantageous embodiment, it is provided that a motor vehicle is displayed as the virtual object. This brings with it among other things the advantage that car dealerships no longer have to maintain a large range of versions of motor vehicles with diverse equipment. Instead, a respective desired configuration of a customer can be displayed particularly realistically in a simple way by using the virtual reality glasses, wherein a salesperson can also easily exert an influence, using the method explained, on the virtual viewing positions from which the customer views the current configured vehicle.

The inventors also propose a system that comprises virtual reality glasses that are designed to display at least one virtual object from a first virtual viewing position. Moreover, the system comprises an external display unit that is designed to display the virtual object and a first position symbol at a position corresponding to the first virtual viewing position and at least one further position symbol at a position corresponding to a further virtual viewing position. The system further comprises a control device that is designed to activate the virtual reality glasses to carry out a virtual position change from the first observation position to the further observation position, whereupon the virtual object is displayed from the further virtual viewing position by the virtual reality glasses if a predetermined confirmation action relative to the further position symbol displayed on the display unit has been detected. Advantageous embodiments of the method are to be considered as advantageous embodiments of the system, wherein the system especially carries out the method.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
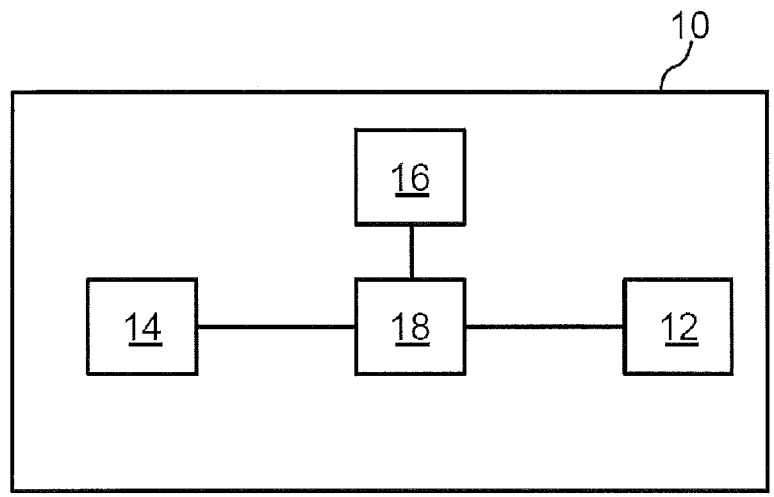
FIG. 1 shows a schematic representation of a system with virtual reality glasses for displaying a virtual motor vehicle.

Reference will now be made in detail to the preferred embodiments of the present invention, examples of which are illustrated in the accompanying drawings, wherein like reference numerals refer to like elements throughout.

An overall system identified by 10 for the representation of virtual reality content is shown in a schematic representation in FIG. 1. The system 10 comprises virtual reality glasses 12, which in the present case are designed to display a virtual motor vehicle. Moreover, the system 10 comprises an external display unit 14 in the form of a tablet computer, which is designed to additionally display the motor vehicle displayed by the virtual reality glasses 12. The system 10 further comprises a remote controller 16, by which the virtual reality glasses 12 can be controlled. The remote controller 16 and the tablet computer 14 are coupled to the virtual reality glasses 12 for data communications by a control device 18. The control device 18 can be integrated within the tablet computer 14 in this case. The control device 18 is designed to activate the virtual reality glasses 12 to carry out a virtual position change, which will be discussed in more detail below.

Figure 2:
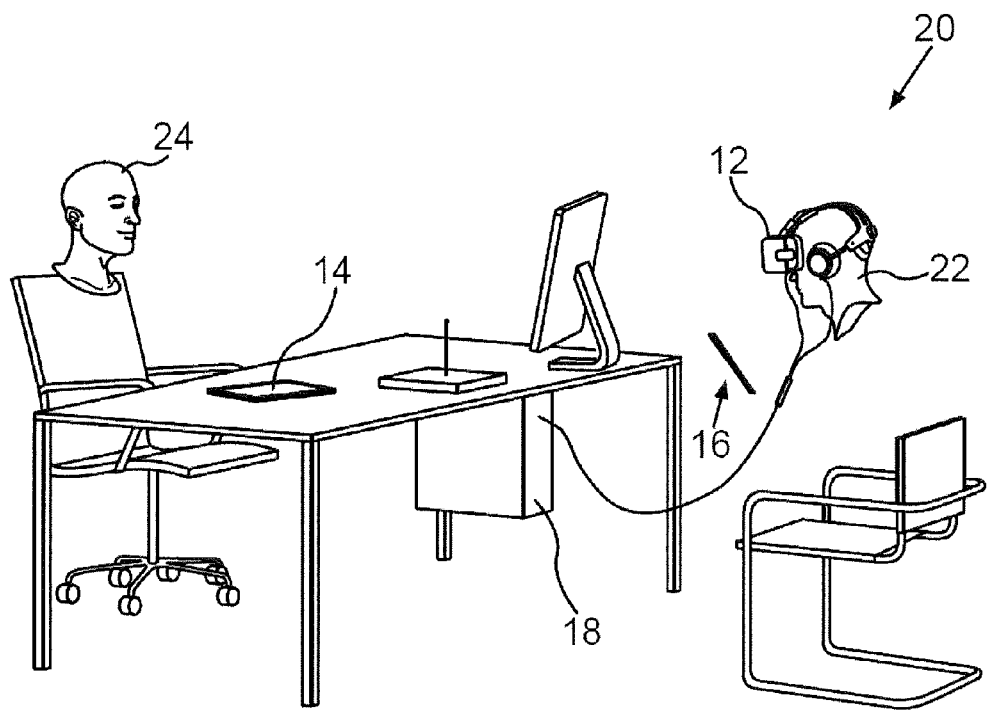
FIG. 2 shows a perspective view of a sales point in a car dealership, in which the system shown in FIG. 1 is used.

In FIG. 2 a sales point 20 is shown that is located in a car dealership. A potential customer 22 is wearing the virtual reality glasses 12 and sitting opposite a salesperson 24. The tablet computer 14 is in front of the salesperson 24 here, wherein the salesperson 24, using the tablet computer 14, can influence which virtual viewing position the customer 22 can use to display a virtual motor vehicle by the virtual reality glasses 12.

Figure 3:
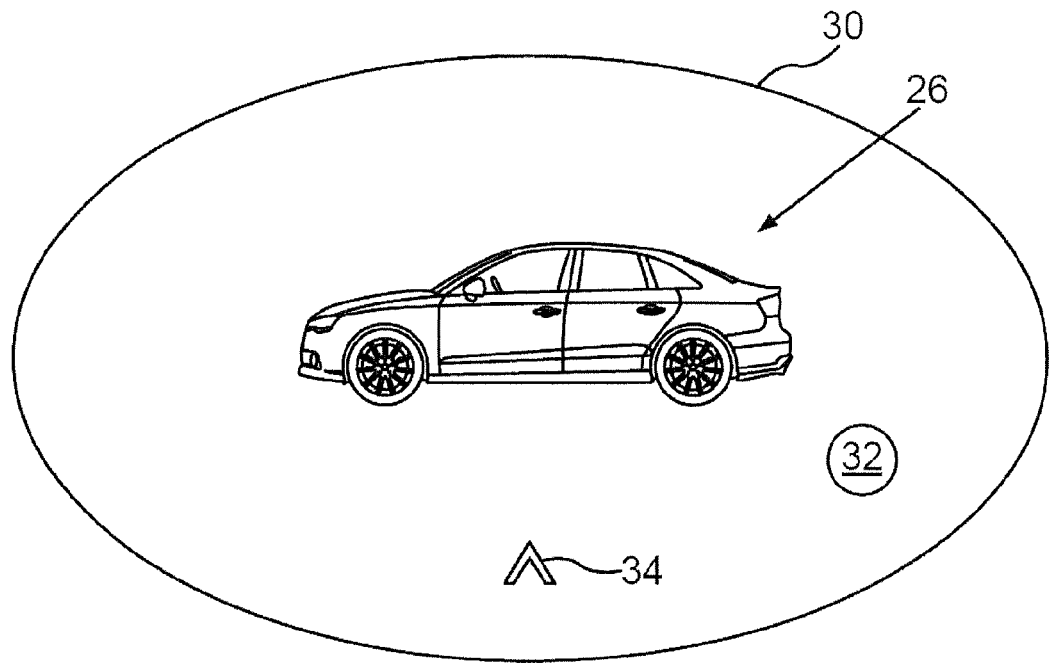
FIG. 3 shows a representation of a virtual motor vehicle that is displayed by the virtual reality glasses from a first virtual viewing position.

In FIG. 3 said virtual motor vehicle 26 is shown as it would be shown by the virtual reality glasses 12 from a first virtual viewing position.

Using the virtual reality glasses 12, a position symbol 32 is also shown in the virtual environment 30 shown here. Said position symbol 32 is disposed in this case at a point within the virtual environment 30 corresponding to another viewing position of the virtual motor vehicle 26. The customer 22 can change the viewing angle of the motor vehicle 26 by tilting his head, wherein in doing so the virtual viewing position remains fixed, however. In other words, the customer 22 does not move within the virtual environment 30, instead of which by head movements he can only move his view to the left and right or up and down within the virtual environment 30.

Once the customer 22 lightly taps the remote controller 16, a selection symbol 34 is faded in. He can for example also move the symbol within the virtual environment 30 using tilting movements of his head. Once he has arranged the selection symbol 34 on the position symbol 32 and then in turn pressed a button on the remote controller 16, the customer 22 can carry out a virtual position change. Then the motor vehicle 26 will be displayed to him from the further virtual viewing position, which is located at the point where the position symbol 32 is shown according to FIG. 3.

However, the situation can also occur for example in which the salesperson 24 wishes to change the virtual viewing position of the customer 22 himself or at least wishes to advise the customer 22 of further virtual viewing positions.

Figure 4:
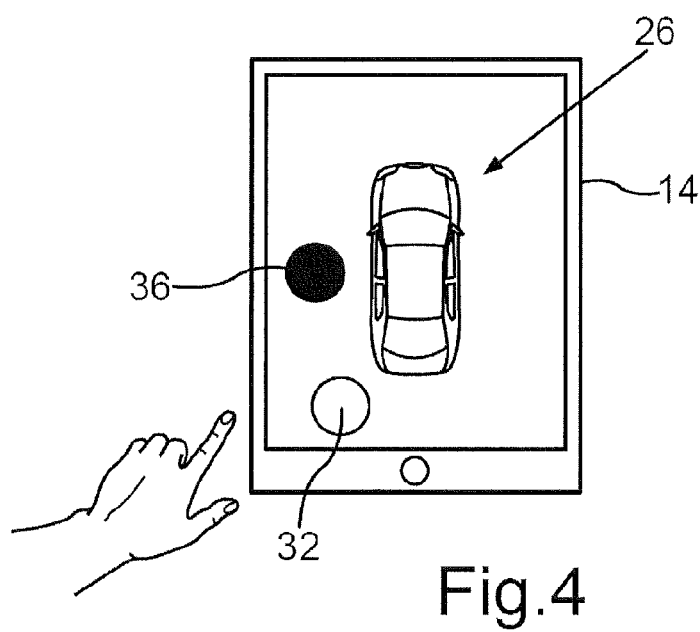
FIG. 4 shows a top view of a tablet computer forming part of the system, wherein the motor vehicle is displayed in a top view on the display of the tablet computer.

The tablet computer 14 is represented In FIG. 4. The virtual motor vehicle 26 is shown here in a top view, wherein apart from the position symbol 32 a further position symbol 36 is displayed. The symbol 36 corresponds here to the first virtual viewing position shown in FIG. 3. The position symbol 32 corresponds to the position symbol 32 shown in FIG. 3. In this case the position symbol 36 is for example shown in a different color from the position symbol 32, so that it can easily be seen by the salesperson 24 that the virtual motor vehicle 26 is currently being displayed from the first virtual viewing position—as illustrated in FIG. 3.

If the salesperson 24 now taps briefly on the position symbol 32, for example with his index finger, then the position symbol 32 displayed by the virtual reality glasses 12 is visually highlighted. For example, the position symbol 32 can be shown flashing; alternatively it would also be conceivable that a type of light beam is radiated vertically upwards within the virtual environment 30 starting from the position symbol 32 or similar. In any case the customer 22 will be visually advised by the visual highlighting of the position symbol 32, so that the salesperson 24 can make the customer 22 aware by vision alone that he wishes to draw the customer's 22 attention to a further viewing position for viewing the vehicle 26.

The customer 22 can then for example, as previously described, independently move the selection symbol 34 over the visually highlighted position symbol 32 and confirm the virtual position change.

Alternatively, it is also possible that the salesperson 24 brings about the virtual position change actively. For this he only has to keep the touched position symbol 32 contacted for slightly longer. It can thereby be provided that the position symbol 32 displayed by the tablet computer 14 and/or the position symbol 32 displayed by the virtual reality glasses 12 is animated. Both the customer 22 and also the salesperson 24 thus see that a virtual position change is imminent.

Alternatively or additionally, it is also possible that a further animation is displayed by the virtual reality glasses 12 and/or by the tablet computer 14. For example, it would be conceivable that a type of countdown is displayed, so that both the salesperson 24 and the customer 22 can know that the virtual position change takes place after expiry of the countdown.

Figure 5:
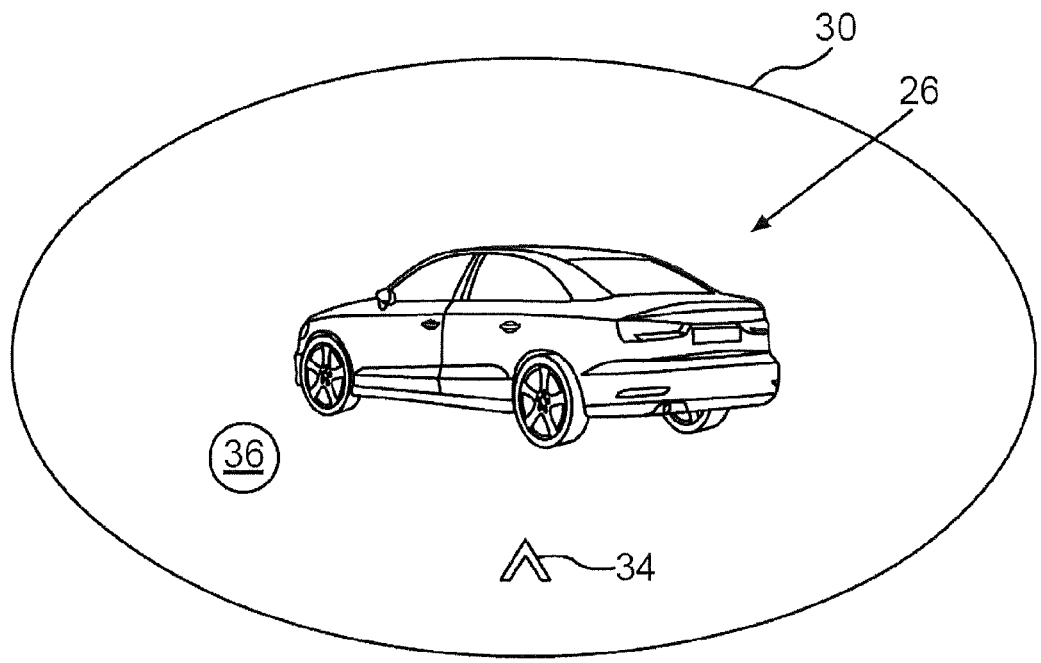
FIG. 5 shows the motor vehicle displayed by the virtual reality glasses, wherein the motor vehicle is displayed from a further virtual viewing position in this case.
Figure 6:
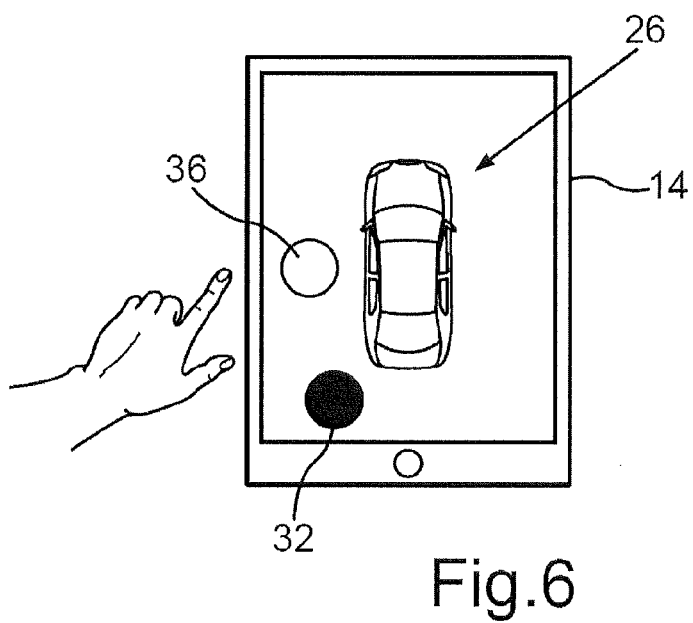
FIG. 6 shows a new representation of the display on the tablet computer, wherein the changed virtual viewing position is identified on the tablet computer.

The virtual motor vehicle 26 is again represented in FIG. 5. In the present case, the virtual position change from the first observation position to the further observation position shown here has already been carried out. The customer 22 is thus now looking at the virtual motor vehicle 26 at an angle from the rear and from the side. The virtual position change is also displayed to the salesperson 24 on the tablet computer 14. As can be seen in FIG. 6, the position symbol 32 is now visually highlighted on the tablet computer 14 compared to the position symbol 36 displayed thereon, so that the salesperson 24 can easily see that the virtual position change has been carried out.

During the virtual position change it can be provided that a type of smooth crossfade takes place from the representation shown in FIG. 3 to the representation shown in FIG. 5. In this case it can for example be provided that the motor vehicle 26 displayed according to FIG. 3 by the virtual reality glasses 12 from the first virtual viewing position is slowly faded out and subsequently the motor vehicle 26 displayed according to FIG. 5 from the further virtual viewing position is slowly faded in again. In order to fade out the virtual motor vehicle 26, for example, a type of virtual aperture can be closed and in order to fade in the virtual motor vehicle 26 the virtual aperture can be opened again. This enables an unintentional disorientation or sudden surprising of the customer 22 to be avoided.

Moreover, it is possible that yet another position symbol that is not shown here is displayed within the virtual environment 30 and on the tablet computer 14. In particular, the further virtual viewing positions associated with the further position symbols can be preferred positions specified by an automobile manufacturer or even by a car dealership, from which it is particularly desirable from the salesperson's point of view to show the motor vehicle 26 to a potential customer. Using the method and the system 10 described, particularly simple control of the virtual viewing position of a customer 22 wearing virtual reality glasses 12 is possible.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for operating virtual reality glasses, comprising:
    displaying a virtual object in a virtual environment for viewing from a first virtual viewing position of a user using the virtual reality glasses;
    simultaneously displaying the virtual object, a first position symbol at a point corresponding to the first virtual viewing position of the user, and a second position symbol at a point corresponding to a second virtual viewing position from which the user is capable of viewing the virtual object, on a display of an external display unit;
    if a predetermined confirmation action in relation to the second position symbol displayed on the display of the external display unit has been detected, carrying out a virtual position change of the user using the virtual reality glasses from the first virtual viewing position of the user to the second virtual viewing position, whereupon the virtual object is displayed in the virtual environment for viewing from the second virtual viewing position of the user using the virtual reality glasses.

2. The method according to claim 1, further comprising:
    displaying the first position symbol and the second position symbol differently from one another on the display of the external display unit.

3. The method according to claim 1, further comprising:
    displaying the virtual object, the first position symbol, and the second position symbol in a top view on the display of the external display unit.

4. The method according to claim 3, wherein the virtual object is displayed in a side view or a perspective view using the virtual reality glasses, concurrently with displaying the virtual object in the top view on the display of the external display unit.

5. The method according to claim 1, further comprising:
    displaying the second position symbol at a point corresponding to the second virtual viewing position of the user using the virtual reality glasses.

6. The method according to claim 1, wherein
    the external display unit is touch sensitive, and
    the virtual position change is carried out if, as the predetermined confirmation action, the external display unit has been touched for at least a specified confirmation period at a point at which the second position symbol is displayed.

7. The method according to claim 6, further comprising:
    visually highlighting the second position symbol displayed using the virtual reality glasses once the external display unit has been touched for at least a specified selection period at the point at which the second position symbol is displayed on the display of the external display unit, wherein the specified selection period is shorter than the specified confirmation period.

8. The method according to claim 7, further comprising:
    detecting whether touching of the external display unit has been maintained for a period of time equal to or greater than the selection period; and
    if touching of the external display unit has been maintained for the period of time equal to or greater than the selection period has been detected, displaying an animation on the display of the external display unit and/or the virtual reality glasses, the animation indicating a remaining period of time that the external display unit must be continued to be touched for the virtual position change to be carried out.

9. The method according to claim 1, further comprising:
    when carrying out the virtual position change, fading out the virtual object displayed from the first virtual viewing position of the user using the virtual reality glasses during a predetermined period, and
    fading in the virtual object displayed from the second virtual viewing position of the user using the virtual reality glasses during another predetermined period.

10. The method according to claim 9, further comprising:
    closing a virtual aperture for fading out the virtual object using the virtual reality glasses; and
    opening the virtual aperture for fading in the virtual object using the virtual reality glasses.

11. The method according to claim 9, wherein the predetermined time period and the another predetermined time period are each about one second.

12. The method according to claim 1, further comprising:
    displaying a motor vehicle as the virtual object.

13. The method according to claim 12, wherein
    a plurality of position symbols are arranged within the virtual environment and at least one of the position symbols is displayed inside the motor vehicle.

14. The method according to claim 1, wherein
    the virtual object is displayed to the user in the virtual environment using the virtual reality glasses, and
    the virtual object is displayed to another user on the display of the external display unit, to control the virtual object displayed in the virtual environment for the user.

15. A virtual reality system, comprising:
    virtual reality glasses configured to display a virtual object in a virtual environment for viewing from a first virtual viewing position of the user;
    an external display unit having a display configured to simultaneously display the virtual object, a first position symbol at a point corresponding to the first virtual viewing position of the user, and a second position symbol at a point corresponding to a second virtual viewing position from which the user is capable of viewing the virtual object; and
    a control device configured to activate the virtual reality glasses to carry out a virtual position change from the first virtual viewing position of the user to the second virtual viewing position, whereupon the virtual object is displayed in the virtual environment for viewing from the second virtual viewing position of the user using the virtual reality glasses, if a predetermined confirmation action in relation to the second position symbol displayed on the display of the external display unit has been detected.

16. The virtual reality system according to claim 15, wherein
    the external display unit is touch sensitive,
    the predetermined confirmation action corresponds to touching the external display unit for at least a first period of time at a point at which the second position symbol is displayed on the display of the external display unit, and
    the virtual position change is carried out if the external display unit is touched for at least the first period of time at the point at which the second position symbol is displayed on the display of the external display unit.

17. The virtual reality system according to claim 16, wherein
    between a time when the external display unit is touched at the point at which the second position symbol is displayed on the display of the external display unit and before the first period of time has elapsed, the second position symbol is visually highlighted on the display of the external display unit and in the virtual environment.

18. The virtual reality system according to claim 16, wherein
between a time when the external display unit is touched at the point at which the second position symbol is displayed on the display of the external display unit and before the first period of time has elapsed, an animation is displayed by the display of the external display unit and the virtual reality glasses indicating a remaining time before the control device activates the virtual reality glasses to carry out the virtual position change from the first virtual viewing position of the user to the second virtual viewing position of the user.

19. The virtual reality system according to claim 16, wherein
a duration of the first period of time is changeable by a user.

20. A method for operating a virtual reality system, the method comprising:
simultaneously displaying, using virtual reality glasses worn by a first user, a virtual object in a virtual environment for viewing by the first user from a first viewpoint of the first user within the virtual environment, an observation symbol at an observation position corresponding to the first viewpoint of the first user within the virtual environment, and a position symbol at a position corresponding to a second viewpoint within the virtual environment from which the first user is capable of viewing the virtual object;

displaying, on a display of an external display device, an overview of the virtual environment for viewing by a second user, the overview of the virtual environment including at least the virtual object and the position symbol at the position corresponding to the second viewpoint within the virtual environment;

receiving an input, at the external display device, with respect to the position symbol at the position corresponding to the second viewpoint within the virtual environment; and in response to receiving the input, relocating the observation position of the first user from the first viewpoint of the first user within the virtual environment to the second viewpoint within the virtual environment and displaying the virtual object in the virtual environment for viewing by the first user from the second viewpoint of the first user within the virtual environment.

* * * * *